Nov. 3, 1936.    F. ZERILLO    2,059,764
PNEUMATIC TIRE
Filed Nov. 3, 1933    2 Sheets-Sheet 1
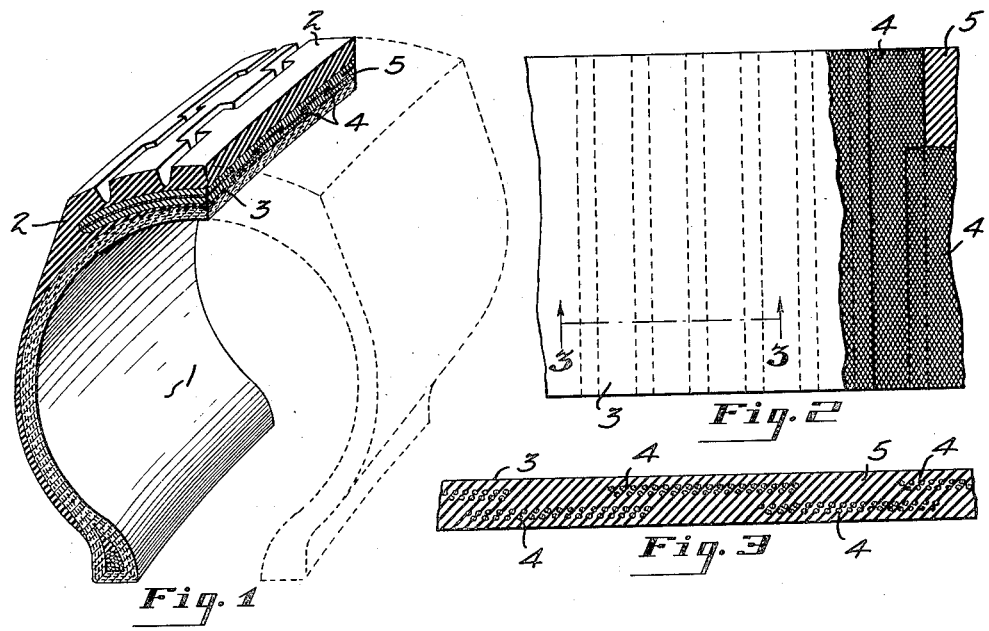
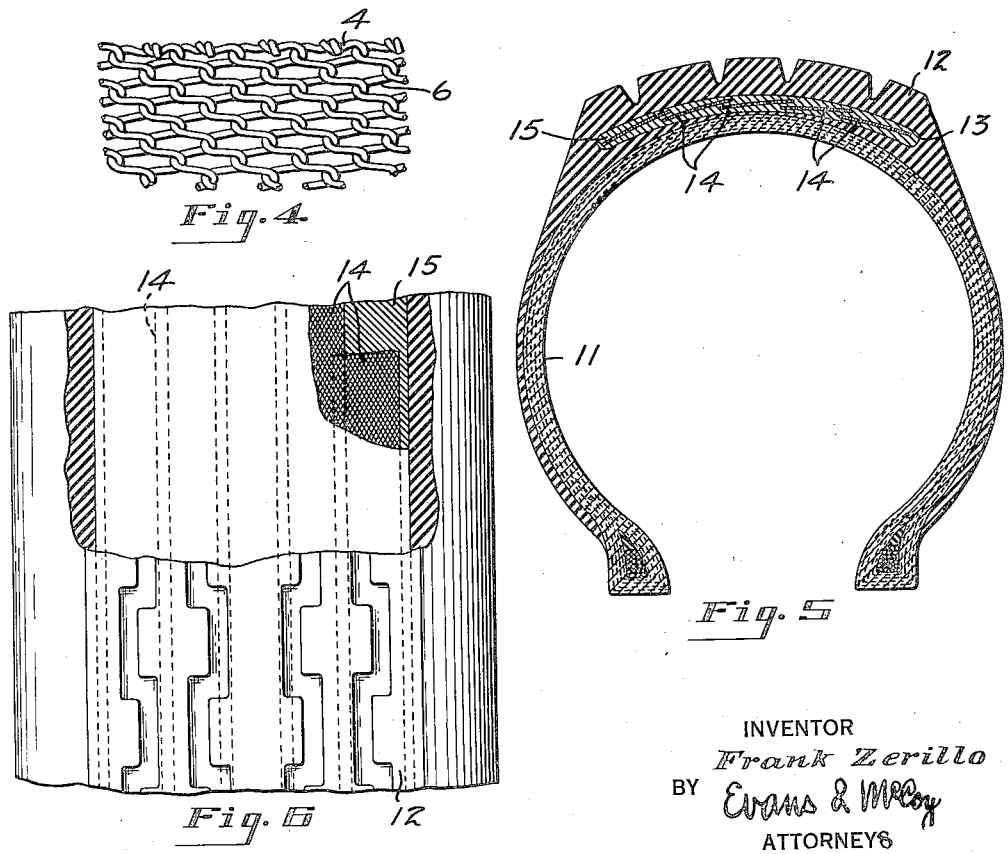
INVENTOR
Frank Zerillo
BY Evans & McCoy
ATTORNEYS Patented Nov. 3, 1936

2,059,764

UNITED STATES PATENT OFFICE 2,059,764

PNEUMATIC TIRE

Frank Zerillo, Brooklyn, N. Y.

Application November 3, 1933, Serial No. 696,500

5 Claims. (Cl. 152—18)

This invention relates to pneumatic tires and particularly to an improved tire tread having metal reinforcement.

The present invention has for its object to provide a tire tread having a metal reinforcement so united to the rubber of the tire tread that it will not be caused to work loose from its rubber covering by flexing of the tread in service.

A further object is to provide a tread reinforcement in the form of a band and composed of a metal core, a covering of rubber of a composition which will promptly adhere to the metal after vulcanization, and which will integrally unite with the tread stock.

A further object is to provide a wear and puncture resisting reinforcement for a tire tread and which is composed of a flexible close mesh wire fabric.

A further object is to provide a reinforcement which may be applied with the tread stock in retreading tires.

With the above and other objects in view the invention may be said to comprise the tire as illustrated in the accompanying drawings, hereinafter described and particularly set forth in the appended claims together with such variations and modifications thereof as will be apparent to one skilled in the art to which the invention appertains.

Reference should be had to the accompanying drawings forming a part of this specification in which:

Figure 1 is a sectional perspective view showing a portion of the tire embodying the invention in transverse and longitudinal section;

Fig. 2 is a fragmentary plan view of the rubber covered reinforcing strip composed of woven wire strips and a covering of rubber;

Fig. 3 is a fragmentary longitudinal section taken on the line indicated at 3—3 of Fig. 2;

Fig. 4 is a fragmentary plan view showing the close mesh wire fabric on an enlarged scale;

Fig. 5 is a transverse section of a tire in which the wire fabric reinforcement is somewhat differently arranged;

Fig. 6 is a fragmentary plan view of the tread of the tire shown in Fig. 5, a portion of the tread being broken away to show the reinforcing material;

Figures 7, 8:
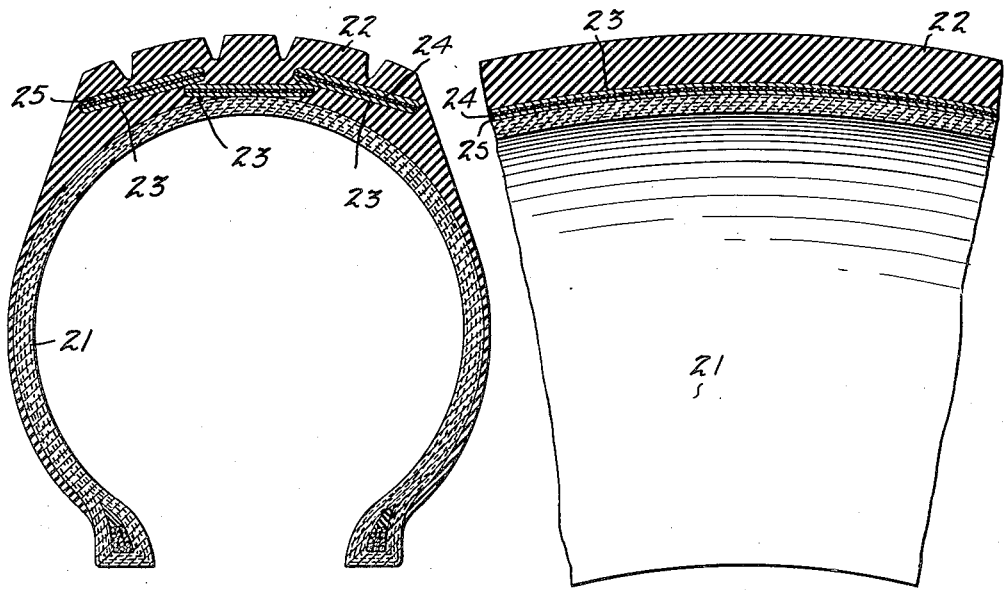
Fig. 7 is a transverse section through a tire in which there is shown a further modified form of tread reinforcement.
Fig. 8 is a longitudinal section through the tread of the tire shown in Fig. 7.

Referring to the accompanying drawings, there is shown in Fig. 1 a tire casing 1 of the usual fabric reinforced construction which has a built-up tread 2 composed of tread rubber stock and a circumferential reinforcing strip 3 which consists of transversely disposed strips of close woven flexible wire fabric 4, and a covering 5 of a rubber composition which firmly adheres upon vulcanization to the metal fabric and which integrally unites with the tread rubber stock.

The wire reinforcing strips 3 are each composed of a series of identical cross strands 6 whose ends are joined together at the edges of the strip and which extend transversely across the strip, each strand being bent alternately in opposite directions to provide uniform corrugations which are interlooped with like corrugations of adjacent strands so that the strands hinge one upon another along transverse lines. The wire fabric is close woven and made of small wire such as 26-gauge wire, each of the strips being similar in construction to the wire mesh strips used in the jewelry industry for watch fobs, bracelets, wrist bands and the like. This wire fabric is resistant to penetration by nails, pieces of metal or the like and protects the tire against puncture.

The transverse strips 3 are preferably placed in overlapping relation throughout the length of the reinforcing strip as shown in Fig. 3.

In building the tire reinforcing strip 3 is applied to the exterior of the tire carcass with the ends of the strip overlapping or abutting end to end, and the tread rubber stock is applied exteriorly. In the tire mold the tread rubber stock is forced around the reinforcing strip and upon vulcanization is integrally united with the rubber of the reinforcing strip.

The composition employed in the reinforcing strip may be different from the composition of the tread rubber stock, being preferably one of various compositions which have greater adhesion upon vulcanization to metal than the rubber stock ordinarily used for tire treads. To provide firmer adhesion between the wire fabric and the rubber enclosing it, the fabric is preferably provided with a flash coating of brass by treating the fabric with a solution of potassium cyanide in which brass has been dissolved.

Referring to Figs. 5 and 6 of the drawings there is shown a tire 11 having a built-up tread 12 within which there is a reinforcing strip 13 which consists of circumferentially extending woven wire fabric strips 14 constructed as shown in Fig. 4, these strips being enclosed in a rubber covering 15. The reinforcing strip may be made up of any desired length and cut to lengths corresponding to the circumference of the tires to which the strip is to be applied.

In applying the strip it is wrapped around the tire on a tire building core with its ends in abutting or slightly overlapping relation.

In Figs. 7 and 8 of the drawings there is shown a tire 21 having a built-up tread 22 within which there are three reinforcing strips 23 arranged in overlapping relation. Each of the strips 23 consists of a close mesh woven wire strip 24 of the character shown in Fig. 4, which is enclosed in a rubber covering 25. The reinforcing strips are made up prior to application to the tire and cut to lengths corresponding to the circumference of the tires to which they are to be applied. The central reinforcing strip may be laid directly upon the tire carcass and the side strip 3 may be laid upon tread stock applied to the carcass on opposite sides of the central strip with their inner edges overlapping the central strip.

Figure 9:
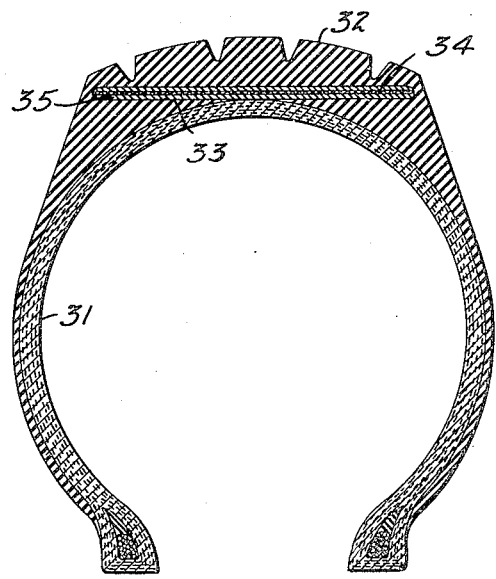
Fig. 9 is a transverse section through a tire having its tread reinforced with a single circumferentially extending strip or a coarse mesh wire fabric.

In Fig. 9 of the drawings there is shown a tire 31 having a built-up tread 32 in which there is a reinforcing strip 33 of a width slightly less than the width of the tread, the opposite edges of the reinforcing strip being spaced inwardly a short distance from the opposite side faces of the tread. The reinforcing strip consists of a close mesh woven wire tape of the construction shown in Fig. 4 and a covering 35 of rubber. The reinforcing strip may be made up in any desired length and cut to lengths corresponding to the circumference of the tire.

In making up the tire strips of unvulcanized tread stock may be laid along opposite shoulder portions of the tire carcass to build them up to substantially the diameter of the central portion of the tire, after which the reinforcing strip composed of the woven wire core and raw rubber covering is wrapped around the tire with the ends thereof abutting or slightly overlapping, after which an exterior layer of unvulcanized tread rubber stock may be applied.

In all of the modifications the reinforcing strip with its raw rubber coating adheres firmly to the rubber of the tire casing and to the exterior layer of tread rubber stock, so that the reinforcing strip is firmly held in place during the vulcanizing operation. After vulcanization the wire tape is embedded in an integral rubber tread.

The reinforcing material of the present invention may be employed in the retreading of tires in which case the reinforcing strip is applied to the tread portion of the tire being retreaded and is then covered with the tread stock.

It will be apparent that the present invention provides a tread reinforcement which resists puncture of the tire and that in the reinforcement will provide a tractive surface after the lugs of the tire tread have been worn off.

Furthermore, it is to be understood that the particular form of tire shown and described, and the particular procedure set forth, are presented for purposes of explanation and illustration and that various modifications of said tire and procedure can be made without departing from my invention as defined in the appended claims.

What I claim is:

1. A pneumatic tire having a built-up tread composed of tread rubber stock, within which there is a circumferential reinforcing strip composed of a rubber composition reinforced by circular strips of closely woven flexible wire fabric completely enclosed in the rubber composition of the reinforcing strip and adhesively united thereto, certain of said wire fabric strips being spaced laterally, one with respect to the other, and other of said wire fabric strips being disposed with opposite longitudinal edges overlapping and spaced from adjacent faces of said laterally spaced strips, the rubber composition of said circumferential reinforcing strip being integrally united with the tread rubber stock.

2. A tire casing comprising carcass plies and a tread, a circumferential strip of rubber between said plies and tread and adhered thereto, and a plurality of metallic meshwork strips freely flexible transversely of the tire and embedded in said rubber strip, said meshwork strips being arranged in separate circumferential series with marginal edges of strips of one series overlapping adjacent edges of strips of another series and separated by the material of said rubber strip to produce flexibility circumferential of the tire, the width of said meshwork strips being such as to permit such circumferential flexibility.

3. A tire having a strip of rubber therein extending transversely between the side walls thereof, and a plurality of metallic meshwork strips freely flexible transversely of the tire and embedded in said rubber strip, said meshwork strips being arranged in separate circumferential series with marginal edges of strips of one series overlapping adjacent edges of strips of another series and separated by the material of said rubber strip to produce flexibility circumferential of the tire, the width of said meshwork strips being such as to permit such circumferential flexibility.

4. A tire casing comprising carcass plies and a built-up tread composed of tread rubber stock, a plurality of metallic meshwork strips freely flexible throughout the tire between said plies and tread, a rubber composition enclosing and having embedded therein said meshwork strips and separating the said strips from adjacent strips, said strips having an edge thereof in overlapped relation with an adjacent strip and of a width to permit of circumferential flexibility, said rubber composition and reinforcing strips being integrally united with the tread rubber stock.

5. A tire having a strip of rubber therein extending transversely between the side walls thereof, of a plurality of metallic meshwork strips freely flexible throughout the tire and embedded in said rubber strip, said strips being arranged in separate circumferential series with a marginal edge of a strip of one series overlapping an adjacent edge of a strip of another series and separated by the material of said rubber strip to produce flexibility circumferentially of the tire, the width of said meshwork strips being such as to permit such circumferential flexibility.

FRANK ZERILLO.